United States Patent
Kondo et al.

[11] Patent Number: 5,103,382
[45] Date of Patent: Apr. 7, 1992

[54] AUXILIARY STOP LAMPS

[75] Inventors: Toshiyuki Kondo, Funabashi; Osamu Waki, Mitaka, both of Japan

[73] Assignee: Stanley Electric Company, Tokyo, Japan

[21] Appl. No.: 614,003

[22] Filed: Nov. 13, 1990

[30] Foreign Application Priority Data

Aug. 7, 1990 [JP] Japan .................. 2-83692[U]

[51] Int. Cl.$^5$ .................................. B60Q 1/26
[52] U.S. Cl. .................. 362/80.1; 362/250; 362/372; 362/800; 362/287
[58] Field of Search ............ 362/61, 80, 80.1, 285, 362/287, 288, 306, 372, 249, 250, 252, 800, 427, 428, 223, 369

[56] References Cited

U.S. PATENT DOCUMENTS

| | | | |
|---|---|---|---|
| 4,449,167 | 5/1984 | Cohen | 362/80.1 |
| 4,521,835 | 6/1985 | Meggs et al. | 362/800 |
| 4,521,839 | 6/1985 | Cook et al. | 362/249 |
| 4,581,687 | 4/1986 | Nakanishi | 362/800 |
| 4,591,954 | 5/1986 | Kawamura et al. | 362/80.1 |
| 4,602,320 | 7/1986 | Tomkin et al. | 362/80.1 |
| 4,787,015 | 11/1988 | Ching-Hwei | 362/80 |
| 4,812,956 | 3/1989 | Chen | 362/249 |
| 4,984,142 | 1/1991 | Garnerone | 362/249 |

FOREIGN PATENT DOCUMENTS 0060448  3/1989  Japan .................. 362/83.3

Primary Examiner—Stephen F. Husar
Assistant Examiner—D. M. Cox
Attorney, Agent, or Firm—Weingarten, Schurgin, Gagnebin & Hayes

[57] ABSTRACT

The present invention relates to an auxiliary stop lamp which is mounted internally of a rear window of a vehicle so as to illuminate the back of the vehicle, characterized in that the auxiliary stop lamp comprises a cylindrical housing in teh form of a transparent flexible member having opening at both ends thereof, side lids mounted on the respective openings of the housing, said side lids each having a base plate mounting portion on the inner surface side of the housing, and an LED mounting base plate formed from a flexible member mounted on the base plate mounting portion of the side lid.

2 Claims, 4 Drawing Sheets

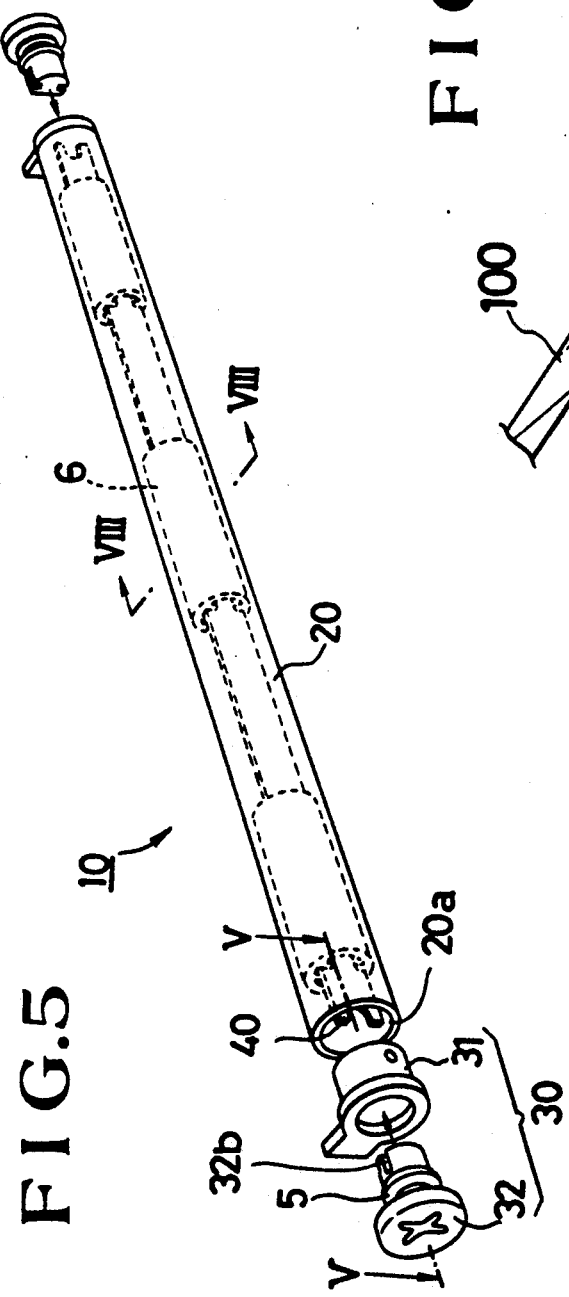
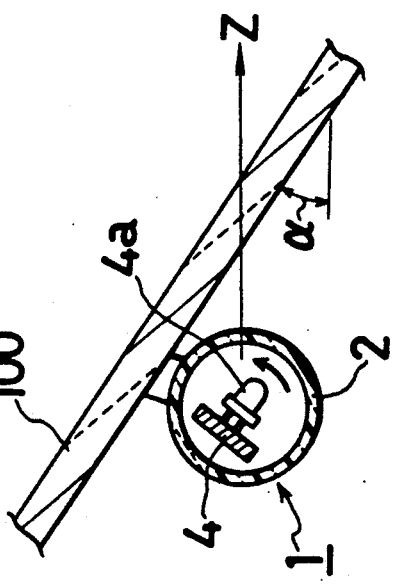

AUXILIARY STOP LAMPS

BACKGROUND OF THE INVENTION

1. Field of the Invention

The present invention relates to lamps mounted on a vehicle such as an automobile, and more specifically to an auxiliary stop lamp, which is called a high-mount stop lamp, mounted within a compartment to serve as an auxiliary lamp of an original stop lamp.

2. Prior Art

A conventional auxiliary lamp 90 of this kind is shown in FIG. 10. The auxiliary lamp 90 comprises a housing 91 having an LED light source, for example, incorporated therein and a mounting leg 92 provided with a hinge portion 92a. The mounting leg 92 is adhered to a rear window glass 100 or mounted by a screw 93 on a ceiling trim 101 of an automobile and thereafter adjusted by the hinge portion 92a so that the housing 91 is directed in a predetermined direction.

However, there is a considerable difference in an angle of inclination and curvature of the rear window glass 10 due to a difference of kind of vehicles. For example, when the auxiliary stop lamp 90 is formed laterally lengthwise in excess of a certain degree in order to increase a visibility and when it is mounted on the vehicle provided with the rear window glass 100 having the strong curvature, both ends thereof become placed in contact with the rear window glass 100, as a result of which the mounting leg 92 cannot be mounted or adjustment of illumination direction cannot be made. For this reason, it is not possible to provide an auxiliary lamp 90 capable of being used for all kinds of vehicles.

SUMMARY OF THE INVENTION

For solving the aforementioned problems of prior art, the present invention provides an auxiliary stop lamp which is mounted internally of a rear window of a vehicle so as to illuminate the back of the vehicle, characterized in that said auxiliary stop lamp comprises a cylindrical housing in the form of a transparent flexible member having openings at both ends thereof, side lids mounted on said respective openings of the housing, said side lids each having a base plate mounting portion on the inner surface side of the housing, and an LED mounting base plate formed from a flexible member mounted on said base plate mounting portion of said side lid. This auxiliary stop lamp can be mounted on all kinds of vehicles, thus solving the aforementioned problems of prior art.

BRIEF DESCRIPTION OF THE DRAWINGS

FIG. 4 is a sectional view taken on line IV—IV of FIG. 3;

FIG. 5 is likewise a perspective view showing a second embodiment of the present invention;

DETAILED DESCRIPTION OF THE PREFERRED EMBODIMENTS

Figure 1:
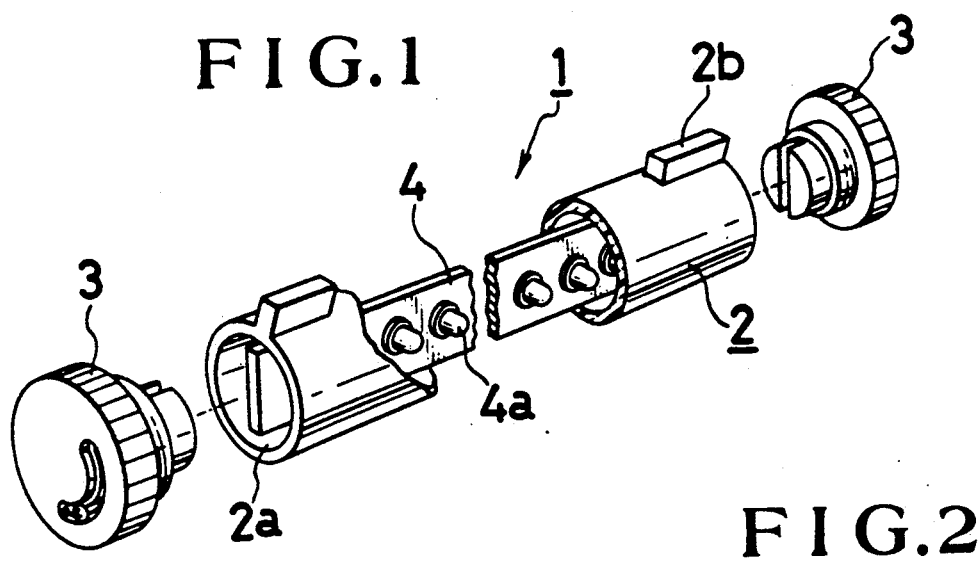
FIG. 1 is a perspective view showing a first embodiment of an auxiliary stop lamp according to the present invention in an exploded state.

The present invention will be described in detail with reference to embodiments shown in the drawings.

An auxiliary stop lamp according to the present invention is indicated at 1 in FIG. 1. A housing Z of the auxiliary stop lamp 1 is formed into a substantially cylindrical configuration having openings 2 on both ends thereof using a soft member, for example, such as vinyl resin which is excellent in tranparency and flexibility.

The housing 2 is integrally formed on both ends with mounting legs 2b which extend in a diametral direction from the aforesaid cylindrical outer peripheral surface and have a suitable length along a longitudinal axis.

Figure 2:
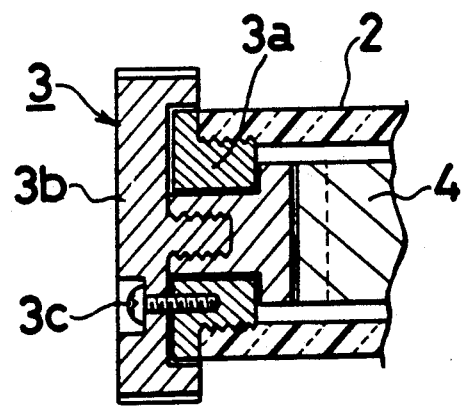
FIG. 2 is a sectional view showing essential parts of the first embodiment.

Cap-like side lids 3 are mounted on the openings 2a, respectively, and an LED mounting base plate 4 for mounting LEDs 4a as a light source within the housing 2 is held by the side lids 3. As shown in FIG. 2, the side lid 3 comprises a hollow housing mounting portion 3a and a base plate mounting portion 3b. The housing mounting portion 3a is fixedly mounted on the housing 2 by suitable means such as a screw, and the base plate mounting portion 3b is formed with a slit for mounting the LED mounting base plate 4 and rotatably mounted coaxial with the housing 2 by a means by which the base plate mounting portion 3b is supported on a hollow portion.

Reference numeral 3c designates a fixed screw. The housing mounting portion 3a and the base plate mounting portion 3b after rotated are fixed at a suitable position by tightening the fixed screw 3c.

The LED mounting base plate 4 is formed, for example, from a thin glass epoxy print circuit base plate, which has a moderate flexibility.

Figure 3:
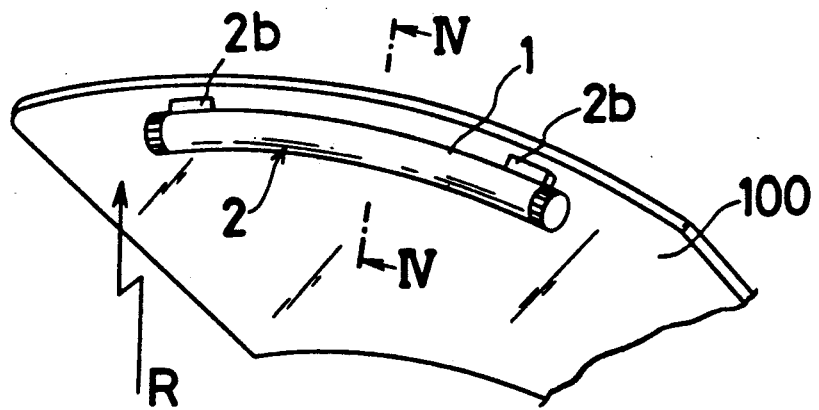
FIG. 3 is likewise a perspective view showing the state where the auxiliary lamp is mounted on the automobile.

FIG. 3 shows the state where the auxiliary stop lamp 1 of the present invention is mounted on a rear window glass 100. The auxiliary stop lamp 1 is adhered to the rear window glass 100 by the mounting leg 2a whereby the auxiliary stop lamp 1 is mounted to be curved along the curvature R in a horizontal direction of the rear window glass 100 due to the flexibility of the member from which the housing 2 is formed.

According to the previous researches made by the inventor as to the rear window glass 100 of a number of automobiles, the curvature R is in the range of approximately 500 to 2000R. No inconvenience occurs in the auxiliary stop lamp within the aforesaid range.

FIG. 4 shows the auxiliary stop lamp 1 adhered to the rear window glass 100 in section in a vertical direction in the state where the stop lamp 1 is mounted. Since the rear window glass 100 has a variety of numeric values of the angle of inclination due to the difference of kind of vehicles, the illumination direction of the LEDs 4a mounted on the LED mounting base plate 4 is not always directed in a predetermined direction indicated at Z.

The rotatable base plate mounting portions 3b on both ends of the housing 2 are rotated and this rotation is locked by the fixed screw 3c when the illumination direction is in the predetermined direction Z. Then, the auxiliary stop lamp 1 illuminates in the predetermined direction Z. Since the housing 2 is formed to be cylindrical, even if the base plate mounting portions 3 are rotated in any direction other than that in which the mounting leg 2a is mounted, no change occurs in the characteristics of the illumination light illuminating outside.

FIG. 5 shows a second embodiment of an auxiliary stop lamp 10 according to the present invention. The second embodiment is similar to the first embodiment in that a housing 20 of the auxiliary stop lamp is formed into a hollow cylindrical configuration having openings 20a on both ends using a resin member which is transparent and soft except that a mounting leg is not provided on the outer diameter side.

Figure 6:
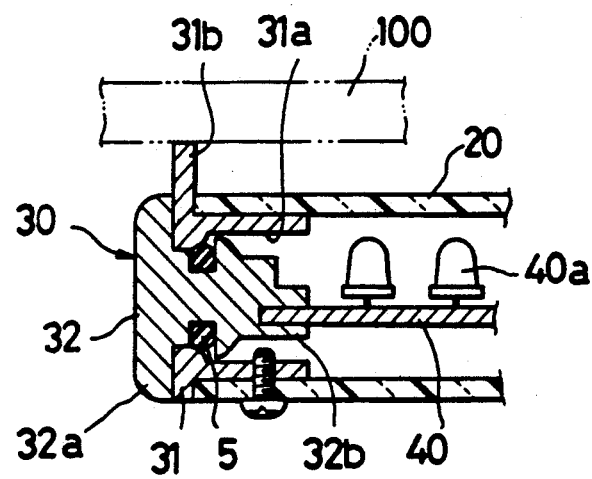
FIG. 6 is a sectional view taken on line V—V of FIG. 5.

Side lids 30 are mounted on the openings 20a on both ends of the housing 20 similar to the previous embodiment and the side lid 30 comprises a housing mounting portion 31 and a base plate mounting portion 32 similarly to the previous embodiment as shown in FIG. 6 in an enlarged scale. The housing mounting portion 31 is in the form of a short cylinder provided in its center with a hollow portion 31a and secured to the end of the housing 20. A mounting leg 31b in the shape (see FIG. 1) similar to that provided on the outer diameter of the housing 2 in the previous embodiment is provided on the outer diameter of the housing mounting portion 31. For example, the mounting leg 31b can be mounted on a rear window glass 100 by means of adhesive.

A base plate mounting portion 32 extends through a hollow portion 31a of the housing mounting portion 31. An umbrella-shaped knob 32a is formed on a portion extended externally of the housing 20 and a slit 32b is formed in a portion located internally of the housing 20. The base plate mounting portion 32 is mounted on a hollow portion 31a of the housing mounting portion 31 through an O-ring 5 whereby the base plate mounting portion 32 can be rotated with respect to the housing 20 similarly to the previous embodiment.

An LED mounting base plate 40 with LEDs 40a mounted thereon similarly to the previous embodiment is mounted on the slit 32b of the base plate mounting portion 32. The LED mounting base plate 40 preferably has a suitable flexibility similar to the housing 20, and is formed, for example, from a member having a softness such as a glass epoxy resin.

Figure 7:
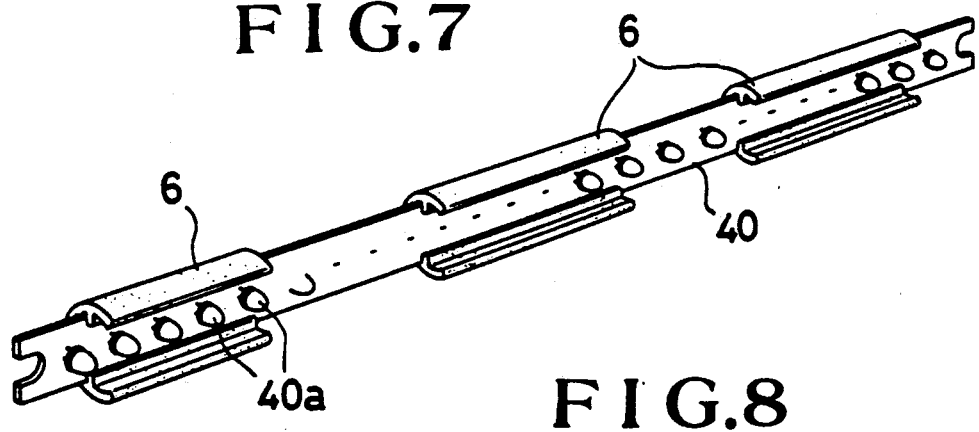
FIG. 7 is a perspective view showing essential parts of the second embodiment.

A suitable number of vibration preventive members 6 formed into a substantially C-shape configuration by a resin member as shown in FIG. 7 according to the present invention are mounted on the LED mounting base plate 40.

Figure 8:
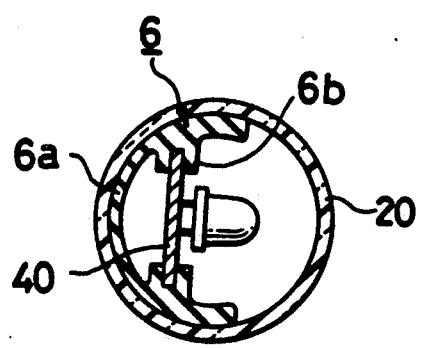
FIG. 8 is a sectional view taken on line VIII—VIII of FIG. 5.

FIG. 8 shows in more detail the vibration preventive member 6. The outer diameter 6a of the vibration preventive member 6 is in sliding contact with the inner diameter of the housing 20. A base plate fitting portion 6b to be fitted on the LED mounting base plate 40 is provided on the inner diameter side of the vibration preventive member 6, whereby the member 6 can be mounted at a free position of the LED mounting base plate 40. Since the vibration preventive member 6 further comes into sliding contact with the inner diameter of the housing 20 and when the LED mounting base plate 40 is rotated by the base plate mounting portion 32, it is rotated in cooperation with the LED mounting base plate 40.

The function and effect of the auxiliary stop lamp 10 constructed as described above will be explained below.

Since the housing 20 is formed form a soft and flexible member, even when the housing 20 is adhered to and mounted on the curved rear window 100 at the mounting leg 30b of the side lid, the housing 20 is curved along the curved surface of the rear window glass 100 similarly to the previous embodiment to avoid an occurrence of a floating portion in the central portion. Particularly when the auxiliary stop lamp 10 is lengthy, it is possible to greatly reduce an extension thereof into the compartment.

To further ensure that the curve of the housing 20 is provided along the curved surface of the rear window glass 100, a mounting leg similar to the side lid 30 may be provided, for example, in the central portion of the housing 20.

Figure 9:
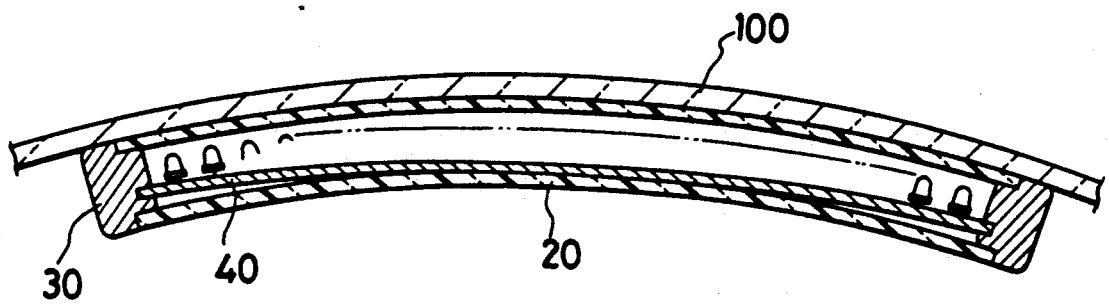
FIG. 9 is an explanatroy view showing the state where a vehicle signal lamp is mounted.
Figure 10:
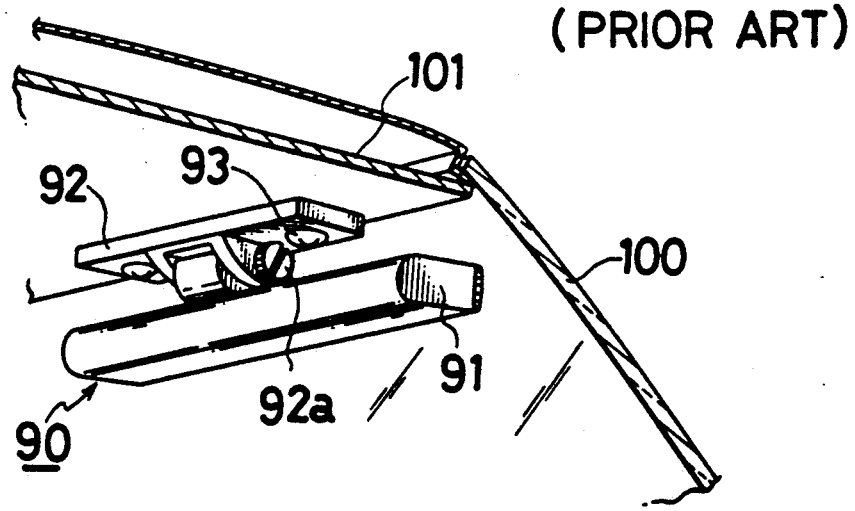
FIG. 10 is a perspective view of a conventional lamp.

In addition, since the vibration preventive member 6 is mounted on the LED mounting base plate 40, first, even when the housing is curved along the rear window glass 100 as described above, the LED mounting base plate 40 is held in position within the housing 20 to prevent the base plate 40 from contacting the housing 20 as shown in FIG. 9 and prevent a variation of light-distribution characteristic caused by a diviation of the base plate 40 from the predetermined position. Secondly, the vibration of the LED mounting base plate 40, which is supported merely at both ends, as the automobile runs, particularly, the vibration in the central portion, may be prevented by the fact that the vibration preventing member 6 is in contact with the inner diameter of the housing 20, thus preventing a flicker of the illumination light or shock noises with the housing caused by the aforesaid vibrations.

As described above, according to the present invention, the housing and the LED mounting base plate of the auxiliary stop lamp are formed to be flexible. Therefore, even in the auxiliary stop lamp which employs a light emitting area in an ample width direction for purposes such as enhancement of visibility, it can be adhered along the curvature of the rear window glass as a mounting surface, thus providing an excellent advantage that the state not capable of mounting encountered in prior art can be overcome and the present configuration can be applied to all kinds of vehicles. Furthermore, since the LED mounting base plate is coaxial with the housing and rotable, it can be suited to a difference in any inclination of the rear window glass to make the aforementioned advantage more positive.

Moreover, since there is provided a vibration preventing member whose outer diameter is in contact with the inner diameter of the housing and the inner diameter is fitted in the LED mounting base plate, even when the stop lamp is mounted on the curved rear window glass, the LED mounting base plate is curved along the curve thereof to prevent it from contacting the housing, prevent the vibration of the LED mounting base plate resulting from the vibration occurred when the automobile runs and suppress the occurrence of a flicker or shock sounds or the like, thus providing excellent advantages in enhancement of practicability of the auxiliary stop lamp of this kind.

What is claimed is:

1. An auxiliary stop lamp which is mounted internally of a rear window so as to illuminate the back of a vehicle, said auxiliary stop lamp comprises a cylindrical housing in the form of a transparent flexible member having openings at both ends thereof, side lids mounted on said respective openings of the housing, said lids each having a base plate mounting portion on the inner surface side of the housing, and an LED mounting base plate formed from a flexible member mounted on said base plate mounting portion of said side lids, said LED mounting base plate being axially rotatable within said cylindrical housing adaptable to direct the light emitted from LEDs, mounted on said LED mounting base plate, horizontally through the rear window of the vehicle.

2. An auxiliary stop lamp according to claim 1, further comprising a mounting leg formed on the outer diameter of said housing at each end of said housing and a plurality of vibration preventing members, each said vibration preventing member comprising a substantially C-shaped support member, whose outer diameter is in contact with the inner diameter of said housing and whose inner diameter is configured to receive said LED mounting base plate, and wherein each said side lid comprises a hollow short cylinder located coaxial with and mounted on the inner diameter of said housing, each lid projecting externally from the housing to form a knob and wherein the internal portion of said base plate mounting portion includes a slit which extends through the base plate mounting portion.

* * * * *